United States Patent [19]

Ross

[11] Patent Number: 4,532,819

[45] Date of Patent: Aug. 6, 1985

[54] COMPACT CRANK DRIVE MECHANISM

[76] Inventor: M. Andrew Ross, 4195 Mumford Ct., Columbus, Ohio 43220

[21] Appl. No.: 581,683

[22] Filed: Feb. 21, 1984

[51] Int. Cl.³ .............................................. F16H 21/22

[52] U.S. Cl. ........................................... 74/44; 74/45; 74/51; 60/525

[58] Field of Search ................. 74/44, 45, 51; 60/517, 60/525

[56] References Cited

U.S. PATENT DOCUMENTS

| | | | |
|---|---|---|---|
| 2,470,809 | 5/1949 | Elants | 74/45 |
| 2,590,662 | 3/1952 | Van Weenen | 60/525 |
| 4,138,897 | 2/1979 | Ross | 74/44 |

*Primary Examiner*—Andrew M. Dolinar

*Attorney, Agent, or Firm*—Frank H. Foster

[57] ABSTRACT

A crankdrive mechanism for the two piston Stirling engine which greatly reduces engine size and weight without increasing complexity or decreasing mechanical efficiency. A single throw crankshaft is located between the cylinders and within the reciprocation limits of at least one of the pistons. An inverted triangular yoke connects the single crankpin with the two connecting rods, which are in turn connected with the respective pistons. A rocking lever connects the yoke with the engine housing and absorbs any side loads associated with the crankdrive mechanism. Extensive clearance provided between the cylinders and in the pistons permits the engine parts to be arranged in a very compact manner with ample running clearance.

6 Claims, 6 Drawing Figures

COMPACT CRANK DRIVE MECHANISM

BACKGROUND OF THE INVENTION

This invention provides a simple and practical method to greatly reduce the size and weight of a single-acting two piston Stirling engine without at the same time increasing its complexity or decreasing its mechanical efficiency.

It is generally agreed that the single-acting two piston Stirling engine is one of the most desirable forms of Stirling for small power applications, having demonstrated both simplicity and good performance. Such engines may be designed in a variety of forms; for example, cylinders may be in a V, in-line, or horizontally opposed arrangement.

One of the most desirable arrangements is the yoke drive described by Ross in U.S. Pat. No. 4,138,897. In this design the lower apex of a triangular yoke is attached to a single-throw crankshaft located beneath twin parallel cylinders. The upper portion of the yoke is constrained by a rocking lever. The upper apexes of the yoke are attached by connecting rods to the respective pistons. Practically all of the side loads encountered in this mechanism are absorbed by the rocking lever bearings. The pistons themselves see very low side loads, and therefore they may be run without liquid lubrication, yet still give long life with low friction losses. The ability to run well without liquid lubrication is an important advantage in a Stirling engine.

Yoke drive Stirling engines have in fact demonstrated excellent mechanical efficiency, and they are relatively simple and inexpensive. Their overall size and weight are comparable to two piston engines of other configurations for a given pressure level and power.

The aim of this invention is to disclose a new form of yoke-based crankdrive mechanism for the two-piston Stirling which offers a very considerable reduction of size and weight in a given engine and yet retains all the known advantages of the previous yoke drive mechanism.

Other aims, features, and advantages will be apparent in the description, below.

SUMMARY OF THE INVENTION

This invention is a crankdrive mechanism for a two piston Stirling engine that greatly decreases engine size and weight by combining the drive mechanism and the pistons in the same compact volume.

In one example, a crankshaft is mounted in a bore that transversely intersects two vertical parallel cylinders within the reciprocation paths of two single acting pistons. A yoke of three arms, in the shape of an inverted "T," is connected on its vertical arm to the single throw of the crankshaft. The other two arms of the yoke extend horizontally into the respective cylinders beneath the pistons. A connecting rod connects each piston with the yoke arm beneath it. A rocking lever, attached at one end to the yoke at the intersection of the yoke arms, and at its other end to the cylinder housing, guides the lower portion of the yoke and absorbs the crank-induced side loads.

Significant portions of the pistons and the cylinder housing are removed to provide clearance for the crankshaft and yoke as they operate within the reciprocation paths of the pistons.

DESCRIPTION OF THE PREFERRED EMBODIMENT

Figure 1:
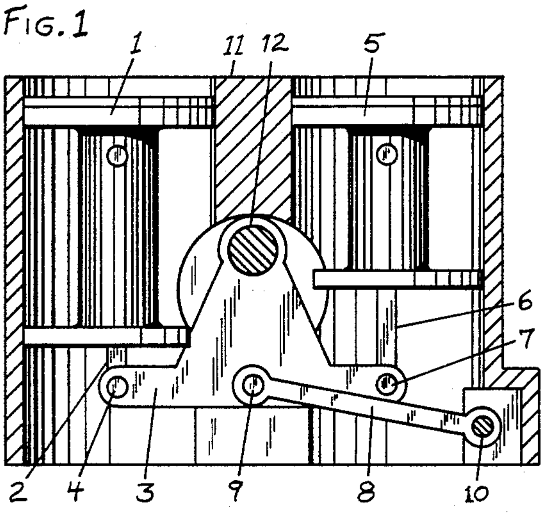
FIG. 1 is a schematic side view of the crankdrive mechanism constructed in accordance with this invention with the crankpin at its top position.

This invention is a crankdrive mechanism for the single-acting two piston Stirling engine. In one example of such a mechanism two vertical, parallel cylinders are incorporated in a housing. A crankshaft bore intersects these cylinders transverse to the plane of their axes, at about the midpoint of their height. The portion of these cylinders extending above the crankshaft bore is left intact, since this portion will constitute the sealing surface for the pistons' seals. The portion of the housing between the cylinders extending below the crankshaft bore is relieved to permit assembly and operation of a yoke and rocking lever.

The yoke in this example has the form of an inverted "T," two of its three arms extending opposite each other horizontally, and the other arm extending vertically upward. The vertical arm contains the crankpin bearing, while the horizontal arms contain the connecting rod bearings. At the junction of the three arms, and in this example equidistant from the axes of their respective bearings, is a fourth bearing for the rocking lever.

In assembly, the yoke, with the rocking lever attached, is inserted into the bottom of the cylinder housing through the relieved portion between the cylinders and into the crankshaft bore. The crankshaft is then inserted in the crankshaft bore and through the crankpin bearing in the yoke. The free end of the rocking lever is then engaged with a shaft inserted transversely through the bottom of the cylinder housing.

It is well known in the art how changing the relative length of the yoke arms will change the phasing of the two pistons, so that a wide range of piston phases may be chosen with only a slight modification of the yoke geometry. These general considerations are equally applicable to the inverted yoke used in this invention. It is less well known, however, that all of these yoke drive engines give a slightly different phase for the pistons at top dead center than at bottom dead center. The reason for this difference is the angularity of the yoke in relation to the crankpin. The crank, yoke, and rocking lever arrangement is similar to a conventional crank, connecting rod, and slider arrangement. Even as connecting rod angularity introduces "dwell" in the slider when it is nearest the crank, and "snap" when it is farthest from the crank, so does yoke angularity introduce rocking lever dwell when the lever is nearest the crank and snap when its farthest from the crank. Thus, a yoke with equidistant arms, which with an infinitesimally small crank would give a 90° piston phase top and bottom, may in a practical design with a longer crankthrow give a 98° phase at one end of its stroke and a 82° phase at the other. With the yoke inverted, as in this invention, the larger phase will occur between the pistons' top dead center positions, and the smaller phase will occur between their bottom dead center position. This situation is desirable, in that it gives a more nearly uniform gas transfer flow rate than does the conventional yoke design, where the smaller phase and small cylinder volumes at top center give faster gas transfer, and the larger phase and large cylinder volumes at bottom center give slower gas transfer.

The pistons in the example of the invention being described are spool shaped in appearance. They have an upper and lower flange for guidance in the cylinder, and a smaller connecting column, to reduce weight and increase clearance for the rotating yoke arm in the waist. The pistons' lower guide flanges are spoked, so as to keep windage losses low. The portions of these lower guide flanges that register with the relieved portions of the lower cylinders are also relieved, to provide clearance for the yoke arms.

In two piston Stirling engines, one piston usually includes an insulating dome which may extend some distance beyond the guided portion of the piston and into the engine's hot volume. The guiding flanges on this piston should be relatively far apart for good mechanical efficiency. The other piston has no such cantilevered appendage, and therefore may have the guiding flanges closer together (i.e. it may be shorter). By pivoting the rocking lever to the frame on the side of the shorter piston, the engine's block height may be kept as short as the limits of reciprocation of the longer piston.

Connecting rods may be relatively long, without adding to the engine's height, due to the inversion of the yoke with respect to the operating faces of the pistons. Once the connecting rods are inserted into the pistons, the piston/rod assemblies may be inserted in the tops of the cylinders, and attached to their respective yoke bearings. This operation completes the basic crank drive assembly. The addition of a heater, regenerator, and cooler will make this machine a stirling engine.

The invention will be more fully explained with reference to the accompanying drawings, which represent an example thereof.

FIG. 1 shows a section side view of the crankdrive mechanism. Hot piston, 1, operates in the hot cylinder, and is connected by connecting rod, 2, to yoke, 3, at wrist pin, 4. Cool piston, 5, operates in the cool cylinder, and is connected by connecting rod, 6, to yoke, 3, at wrist pin, 7. One end of rocking lever, 8, is connected to yoke, 3, at point, 9, midway between the wrist pins, 4 and 7. The other end of lever, 8, is pivoted on a pin, 10, fixed to cylinder housing, 11. The crankshaft is located between the pistons and within the limits of their reciprocation, and it is connected to yoke, 3, at crankpin, 12. Pistons, 1 and 5, and cylinder housing, 11, are specifically designed so as to provide running clearance for yoke, 3, lever, 8, and crankpin, 12.

Figure 2:
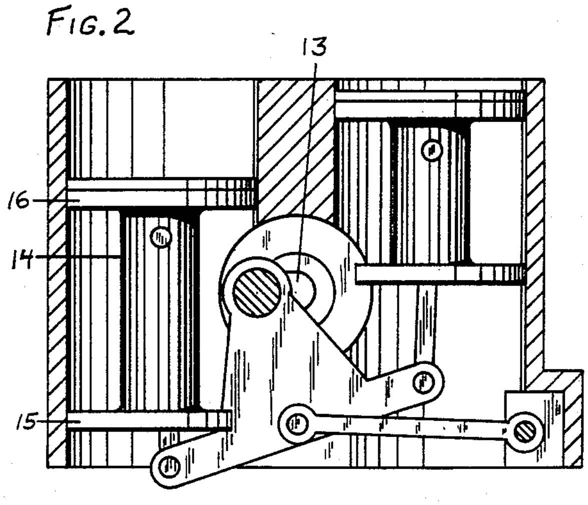
FIG. 2 is the same view of the engine in FIG. 1 with the crankshaft advanced 90°.

FIG. 2 shows the same mechanism during the power stroke, after crankshaft, 13, has moved 90° in its direction of travel. It is worth noting that the inverted yoke produces a direction of rotation opposite that of a conventional yoke drive mechanism. Hot piston, 1, is about halfway along its expansion stroke, while cool piston, 5, is at nearly the same position as in FIG. 1. Relieved portions of waist, 14, and bottom guide flange, 15, of hot piston, 1, provide running clearance for yoke, 3, and crankpin, 12. Hot piston, 1, is longer than cool piston, 5, because in an actual engine the hot piston would carry a cantilevered insulation dome above it, and therefore requires guide flanges, 15 and 16, that are spaced farther apart than those of the cool piston, for good mechanical efficiency.

Figure 3:
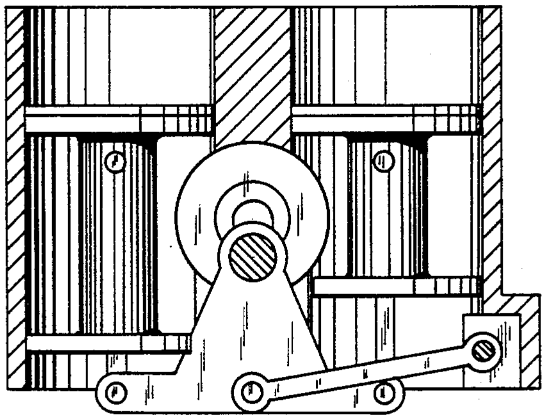
FIG. 3 is the same view of the engine in FIG. 1 with the crankshaft advanced 180°.

FIG. 3 shows the mechanism at its point of maximum volume, with the crankshaft advanced 180° from FIG. 1. While pistons, 1 and 5, appear to be in the same position, cool piston, 5, is actually moving up while hot piston, 1, is continuing down to complete its expansion stroke.

Figure 4:
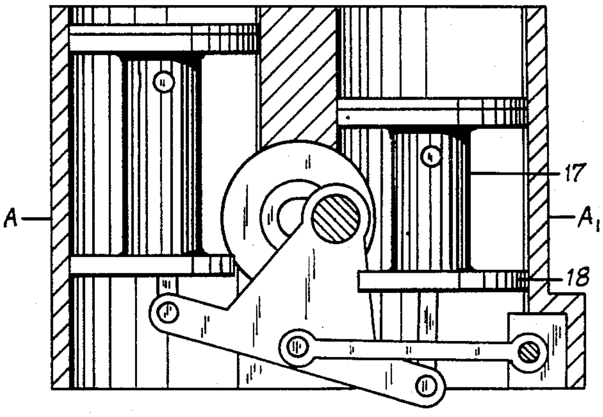
FIG. 4 is the same view of the engine in FIG. 1 with the crankshaft advanced 270°.

FIG. 4 shows the mechanism during its compression stroke, with the crankshaft advanced 270° from its position in FIG. 1. In this position, it is the relieved portions of waist, 17, and bottom guide flange, 18, of cool piston, 5, that provide running clearance for yoke, 3, and crankpin, 12.

Figure 5:
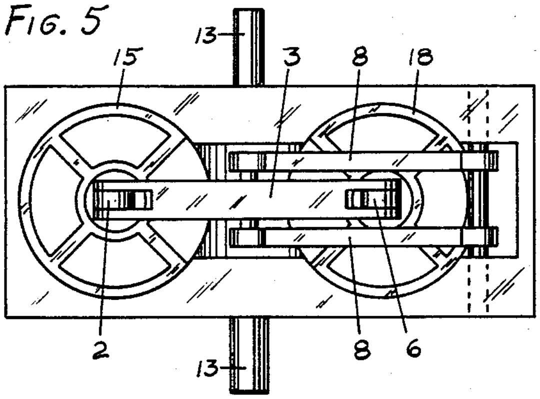
FIG. 5 is a bottom view of the engine as shown in FIG. 3.

FIG. 5 shows the bottom view of the mechanism as shown in FIG. 3. Crankshaft, 13, may be seen extending on either side of cylinder housing, 11, and suitable counterbalance weights may be attached on both sides as desired. Yoke, 3, is guided by lever, 8, which in this case is a split lever extending on both sides of yoke, 3. The bottom guide flanges, 15 and 18, of both pistons, 1 and 5, respectively, are spoked to reduce weight and windage loss, and relieved to provide running clearance for the yoke.

Figure 6:
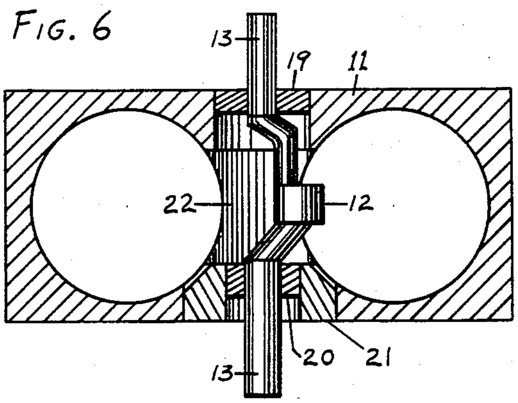
FIG. 6 is a bottom sectional view of the engine as shown in FIG. 4, through section A—$A_1$, with the pistons and yoke removed.

FIG. 6 is a bottom view, through section A—$A_1$, of the mechanism as shown in FIG. 4, with all parts removed except crankshaft, 13, which is located in crankshaft bore, 22, of cylinder housing, 11, crankshaft bearings, 19 and 20, and front bearing case, 21. Crankshaft, 13, is designed so that it may easily be inserted through the crankpin bearing of yoke, 3, even though it is of one piece. Removable bearing case, 21, provides adequate clearance for assembly of crankshaft, 13, into housing, 11.

What I claim is:

1. A crank drive mechanism for drivingly linking a crankshaft to two pistons which reciprocate along substantially parallel axes lying in a plane with a desired phase difference in two adjacent cylinders formed by cylinder walls of a housing, said mechanism comprising:

(a) A crankshaft journalled to said housing, the axis of said crankshaft being located between said cylinders, within the limits of reciprocation of at least one of said pistons, and transverse to the plane of the axes of said cylinders;

(b) A yoke with 4 pivot axes, said yoke rotatably attached to the throw of said crankshaft at a first one of said yoke pivot axes to define a circularly moving portion of the yoke;

(c) A pair of connecting rods, each rod pivotally connected at one end to said yoke at second and third yoke pivot axes, respectively, and pivotally connected at its opposite end to a different one of said two pistons; and (d) A rocking lever pivotally attached at one end to said housing laterally of said yoke and pivotally attached to said yoke at a fourth yoke pivot axis;

wherein a portion of at least one cylinder wall is relieved and the circularly moving portion of the yoke passes through the relieved portion of the wall.

2. A crank drive mechanism in accordance with claim 1 wherein the connecting rod pivot axes on said yoke are equidistant from the rotation axis of said throw and wherein the rocking lever pivot axis on said yoke is centered between said connecting rod pivot axes.

3. A mechanism in accordance with claim 1 wherein a portion of at least one piston is also relieved and the circularly moving portion of the yoke passes through the relieved portion of the piston.

4. A crank drive mechanism for drivingly linking a crankshaft to two pistons which reciprocate along axes lying in a plane with a desired phase difference in two adjacent cylinders in a housing, said mechanism comprising:

(a) A crankshaft journalled to said housing, the axis of said crankshaft being located between said cylinders, within the limits of reciprocation of at least one of said pistons, and transverse to the plane of the axes of said cylinders;

(b) A yoke with 4 pivot axes, said yoke rotatably attached to the throw of said crankshaft at a first one of said yoke pivot axes;

(c) A pair of connecting rods, each rod pivotally connected at one end to said yoke at second and third yoke pivot axes, respectively, and pivotally connected at its opposite end to a different one of said two pistons; and (d) A rocking lever pivotally attached at one end to said housing laterally of said yoke and pivotally attached to said yoke at a fourth yoke pivot axis;

wherein a passageway is formed in a portion of said housing extending between said cylinders, and wherein a portion of each of said pistons which registers with said passageway is relieved to provide running clearance for said yoke.

5. A crank drive mechanism in accordance with claim 4 wherein a passageway is formed in a portion of said housing extending between said cylinders, and wherein a portion of each of said pistons which registers with said passageway is relieved to provide running clearance for said crankshaft.

6. A crank drive mechanism in accordance with claim 5 wherein the connecting rod pivot axes on said yoke are equidistant from the rotation axis of said throw and wherein the rocking lever pivot axis on said yoke is centered between said connecting rod pivot axes.

* * * * *